US010783688B2

(12) United States Patent
Walters et al.

(10) Patent No.: US 10,783,688 B2
(45) Date of Patent: *Sep. 22, 2020

(54) METHODS AND ARRANGEMENTS TO CREATE IMAGES

(71) Applicant: Capital One Services, LLC, McLean, VA (US)

(72) Inventors: Austin Grant Walters, Savoy, IL (US); Fardin Abdi Taghi Abad, Champaign, IL (US); Jeremy Edward Goodsitt, Champaign, IL (US); Reza Farivar, Champaign, IL (US); Kenneth Taylor, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/707,996

(22) Filed: Dec. 9, 2019

(65) Prior Publication Data

US 2020/0226807 A1    Jul. 16, 2020

Related U.S. Application Data

(63) Continuation of application No. 16/244,836, filed on Jan. 10, 2019, now Pat. No. 10,540,798.

(51) Int. Cl.
| | |
|---|---|
| *G09G 5/00* | (2006.01) |
| *G06T 11/60* | (2006.01) |
| *G06N 20/00* | (2019.01) |
| *G06N 3/04* | (2006.01) |
| *G06N 3/08* | (2006.01) |
| *G06T 11/20* | (2006.01) |

(52) U.S. Cl.
CPC ............ *G06T 11/60* (2013.01); *G06N 3/0454* (2013.01); *G06N 3/084* (2013.01); *G06N 3/088* (2013.01); *G06N 20/00* (2019.01); *G06T 11/20* (2013.01)

(58) Field of Classification Search
CPC ............... G09G 5/14; G09G 2340/10; G09G 2340/125; G06T 11/60; G06T 15/503
USPC ....................................... 345/629
See application file for complete search history.

(56) References Cited

U.S. PATENT DOCUMENTS

| | | | |
|---|---|---|---|
| 2002/0030634 A1* | 3/2002 | Noda ...................... | G06T 11/60 345/5 |
| 2019/0012802 A1* | 1/2019 | Liu ........................... | G06T 7/73 |

\* cited by examiner

*Primary Examiner* — Gordon G Liu

(57) ABSTRACT

Logic may create new images by adding more than one synthetic image on a template. Logic may provide a template with a background for a new image. Logic may provide a set of models, each model to comprise a generative adversarial network (GAN), the GANs pretrained independently to generate different synthetic images. Logic may select two or more models from the set of models. Logic may generate, by the two or more models, two or more of the different synthetic images. Logic may combine the two or more of the different synthetic images with the template to create the new image. And logic may train a set of GANs independently, to generate one of two or more different synthetic images on a blank image background, the different synthetic images to comprise a subset of the multiple features of a new image.

20 Claims, 7 Drawing Sheets

METHODS AND ARRANGEMENTS TO CREATE IMAGES

CROSS-REFERENCE TO RELATED APPLICATION(S)

This application is a divisional of U.S. patent application Ser. No. 16/244,836, entitled "METHODS AND ARRANGEMENTS TO CREATE IMAGES" filed on Jan. 10, 2019. The contents of the aforementioned application are incorporated herein by reference in its entirety.

TECHNICAL FIELD

Embodiments described herein are in the field of image generation. More particularly, the embodiments relate to methods and arrangements to create images with neural networks.

BACKGROUND

Image generation has many applications from the creation of art to object creation for features or scenes in video games. Many employ a class of machine learning architectures comprised of two models that are adversarial referred to as generative adversarial networks (GANs) to create images due their creative nature.

Generative adversarial networks (GANs) include two machine learning models that interact to train. GANs' learn to mimic distributions of data and, thus, can be taught to create, e.g., images, music, speech, and prose.

SUMMARY

Embodiments may comprise various forms such as a method, a storage medium, an apparatus, a system, and the like. One embodiment is an apparatus comprising memory; and logic circuitry coupled with the memory. The apparatus may provide a template, the template to comprise a background for a new image and provide a set of models, each model to comprise a generative adversarial network (GAN). In some embodiments, the GANs are pretrained independently to generate different synthetic images. The apparatus may also select two or more models from the set of models; generate, by the two or more models, two or more of the different synthetic images; and combine the two or more of the different synthetic images with the template to create the new image.

One embodiment is a non-transitory storage medium containing instructions, which when executed by a processor, cause the processor to perform operations. The operations may provide a base image, the base image to comprise a background for a new image; provide a library of models, each model to comprise a generative adversarial network (GAN), the GAN pretrained to generate a different synthetic image; and select two or more models from the library of models. The operations may also generate, by the two or more models, two or more of the different synthetic images; and combine the two or more of the different synthetic images with the base image to create the new image.

One embodiment is a system. The system may comprise memory and logic circuitry coupled with the memory. The logic circuitry may train a set of GANs independently, to generate one of two or more different synthetic images on a blank image background. The different synthetic images may comprise a subset of multiple features of a new image. The logic circuitry may also train an overlay model to combine the two or more different synthetic images from the set of GANs with a template to create the new image, the template to comprise a background image or a blank image background.

DETAILED DESCRIPTION OF EMBODIMENTS

Figure 1B:
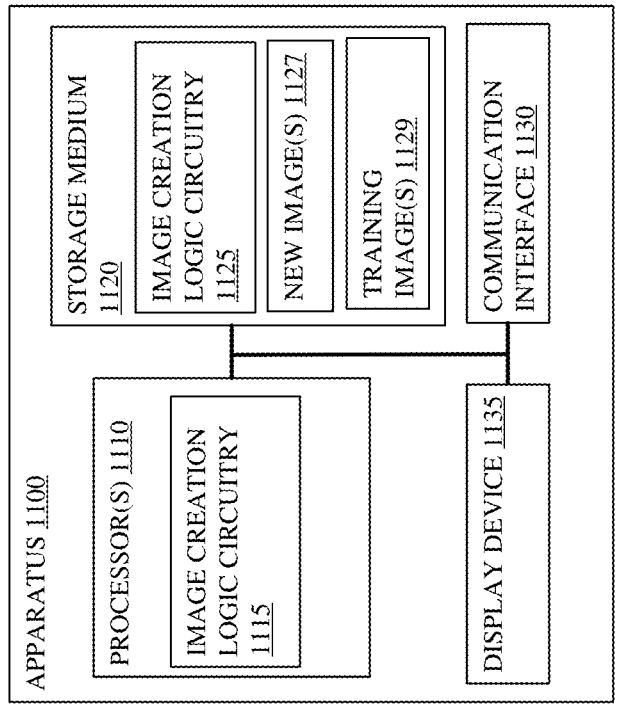
FIGS. 1A-B depict embodiments of systems including servers, networks, and customer devices to create new images.

The following is a detailed description of embodiments depicted in the drawings. The detailed description covers all modifications, equivalents, and alternatives falling within the appended claims.

The success of generative adversarial networks (GANs) in the creation of images relates to the type of image being created and the training of the GANs. GANs have difficulty creating or recreating realistic photos with respect to human scrutiny and with depth since GANs train with two-dimensional images.

GANs may employ two machine learning models that compete with one another to train. A first model, referred to as a generative model, may generate or create an image, and a second model, referred to as a discriminative model, may evaluate the output image from the generative model to determine if the output image looks real or looks synthetic or fake. A gradient of the objective function of the generative model output image based on the evaluation by the discriminative model, can backwards propagate (backpropagate or backprop) error through the layers of the generative model to improve the ability of the generative model to create images with one or more features found in training images.

In general, the generative model may generate features (x) in the new image given the class of the image (y) and the discriminative model may determine a class of the image (y) given the features (x). In other words, the generative model may generate a mapping, or approximation, of the features $(x)=G(z)$ for a new image based on the probability of x given y, $p(x|y)$, and the discriminative model may determine a class $(y)=D(x)$ of an image based on the probability of y given x, $p(y|x)$ where x represents a set of features of training images in the class y; z is a random number or sample of a distribution such as a Gaussian distribution; G(z) represents a transfer function of the generative model; and D(x) and D(G(z)) represent the transfer function of the discriminative model with training images and images created by the generative model, respectively.

During the training, the discriminative model trains to map features (x) of the class (y), by updating D(x) through backpropagation through the layers of the discriminative model. After some training of the discriminative model, the generative model trains by creating images with the features x=G(z) for evaluation by the discriminative model. The generative model learns to create features (x) of the class (y) through feedback via backward propagation of evaluations of the output images by the discriminative model via comparison of D(x) with D(G(z)).

Thereafter, the generative model competes with the discriminative model to continue the training by attempting to maximize the probability that G(z) will be evaluated by the discriminative model as being within the class (y). The discriminative model receives a combination of training images of class (y) and images generated by the generative model G(z) and attempts to maximize the ability to distinguish between D(G(z)) and D(x).

Embodiments may train GANs to create attributes or features of an image and may advantageously employ the creative nature of the trained GANs to create new images by layering the features on a template, or base image. Example embodiments train multiple GANs independently to generate one or more features of an image to create a set or library of models, select two or more of the models to create a new image, generate different respective synthetic images based on each of the two or more selected models to form layers of the new image, and combine the different synthetic images of the new image with the base image to create the new image.

When training neural networks such as GANs to create images or other neural networks to, e.g., recognize objects, faces, or other features with images, the neural networks may require thousands, tens of thousands, or hundreds of thousands of images depending on the nature of the training. The images may offer a variety of quality levels of images to increase the robustness in training. For documents, for instance, thousands of images of the documents with various forms of degrading features can be useful. Different degradations that a real-world document may have include, e.g., dirt, smudges, fingerprints, wrinkles, scanning artifacts, coffee stains, and the like.

Some embodiments generate layers of degrading synthetic images, such as dirt, smudges, fingerprints, wrinkles, scanning artifacts, coffee stains, and the like, to degrade base images to create a new image that is indicative of a degraded base image. For example, one embodiment may use a clean document as a base image and select two or more models from a model library, e.g., at random, to generate layers of synthetic images that degrade the clean document to create a new document that appears to be degraded through multiple iterations of scanning and copying. In some of these embodiments, for instance, one of the models may be trained to generate a synthetic image of fingerprints, one of the models may train to generate a synthetic image of smudges, one of the models may train to generate a synthetic image of dirt or tar; and/or the like. Image creation logic circuitry may randomly select between, e.g., 2 and 20 of the models, generate a synthetic image, G(z), with each of the selected models, and combine the synthetic images with a template that is a base image of the clean document to create a document that appears to have been copied and scanned multiple times. In some embodiments, the process of generating and combining is iterative and involves repeatedly generating a synthetic image on a prior image.

Other embodiments generate different synthetic images of features to create a new image on a template such as on a background image or a blank image background. Some of these embodiments include image creation logic circuitry to create a new image based on a template of a blank image background. In such models, the image creation logic circuitry may select a model to generate a first synthetic image as a background layer, select one or more models to generate different synthetic images as intermediate layers, and select a model to generate a last synthetic image as a foreground layer. The image creation logic circuitry may combine these synthetic images to create a new image serially or in parallel.

Some embodiments combine synthetic images such as the fingerprints and dirt or the background and foreground by interconnecting the models in series wherein the input of each successive model comprises the output of the previous model. In particular, the first model may receive an input of the template; generate, with a generative model, a first synthetic image with the template to output the first synthetic image. The subsequent model in the series of models may receive the first synthetic image as an input, generate a second synthetic image with the first synthetic image and output a second synthetic image. This process may continue until the last model in the series of models receives the second to last image as an input, generates a last synthetic image with the second to last image, and outputs the last synthetic image as the new image.

Other embodiments may generate synthetic images in parallel, or concurrently, and combine the synthetic images to a template, or base image, to create a new image. In some of these embodiments, an overlay model may combine the synthetic images in a drawing structure that includes the template as a base layer and the synthetic images as filters or layers above of the base layer. In other embodiments, the overlay model may apply one or more of or all the synthetic images to the template in a single layer.

In further embodiments, the overlay model may comprise an overlay GAN that is trained to combine the synthetic images with the template. In such embodiments, for instance, the overlay GAN may train with examples of documents that have one or more of the features to learn to combine the synthetic images with the template.

Note that logic circuitry refers to circuitry that implements logic with discrete components and/or integrated circuits; circuitry with processing capabilities to perform logic at least partially in the form of code along with the code; circuitry with buffers, other storage media, and/or other storage capabilities to store code along with the code; and/or a combination thereof.

Some embodiments comprise systems with multiple processor cores such as central servers, access points, and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. In various embodiments, these devices relate to specific applications such as healthcare, home, commercial office and retail, security, and industrial automation and monitoring applications, as well as vehicle applications (automobiles, self-driving vehicles, airplanes, drones, and the like), and the like.

Figure 1A:
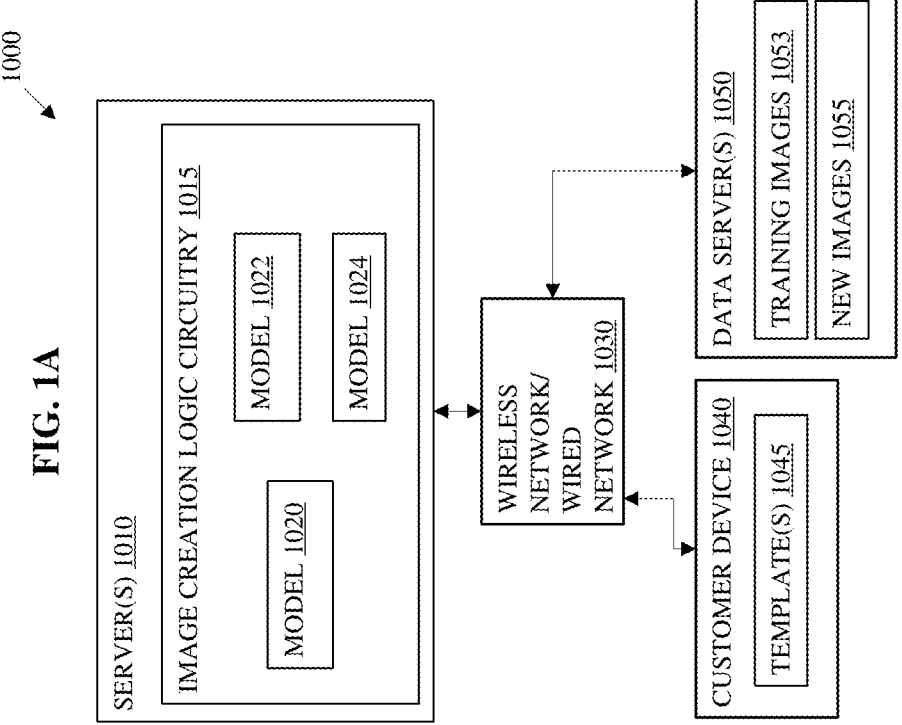

Turning now to the drawings, FIGS. 1A-B depict embodiments of systems including servers, networks, and customer devices to create new images. FIG. 1A illustrates an embodiment of a system 1000. The system 1000 may represent a portion of at least one wireless or wired network 1030 that interconnects server(s) 1010 with a customer device 1040 and data server(s) 1050. The at least one wireless or wired network 1040 may represent any type of network or communications medium that can interconnect the server(s) 1010 with the customer device 1040 and data server(s) 1050, such as a cellular service, a cellular data service, satellite service, other wireless communication networks, fiber optic services, other land-based services, and/or the like, along with supporting equipment such as hubs, routers, switches, amplifiers, and/or the like.

In the present embodiment, the server(s) 1010 may represent one or more servers owned and/or operated by a company that provides services. In some embodiments, the server(s) 1010 represent more than one company that provides services. For example, a first set of one or more server(s) 1010 may provide services including pretraining models 1020, 1022, and 1024 of an image creation logic circuitry 1015 with training images. The first set of server(s) 1010 may comprise or retrieve training images such as thousands, tens of thousands, or hundreds of thousands of images per attribute, or feature, or set of attributes or features represented by the each of the models 1020, 1022, and 1024.

The first set of server(s) 1010 may pretrain the models 1020, 1022, and 1024 to detect, classify, and/or predict actual images to discriminate between actual images and synthetic images, as well as generate synthetic images similar to or indistinguishable from the actual images by training the models 1020, 1022, and 1024. The models 1020, 1022, and 1024 may comprise one or more variations of a class of machine learning architecture referred to as generative adversarial networks (GANs). Each of the GANs may include a generative model and a discriminative model. In the present embodiment, the first set of server(s) 1010 may retrieve the training images 1053 from the data server(s) 1050 and may store a portion of or all the training images 1053 locally in the server(s) 1010 during training.

The first set of server(s) 1010 may pretrain each of the generative and discriminative models of the models 1020, 1022, and 1024 individually before training the models 1020, 1022, and 1024 as a whole. For instance, some embodiments may freeze training of the generative models while pretraining the discriminative models for a number of epochs. Thereafter, such embodiments may train the generative models with feedback from the discriminative models while training of the discriminative models is frozen. This process may repeat one or more times prior to training each pair of the generative and discriminative models in each model 1020, 1022, and 1024 concurrently. In particular, once the discriminative models are trained to some extent, the discriminative models can evaluate synthetic images created by the generative models and train the generative models based on backwards propagation of the output from the discriminative models. During the initial training of the generative models, such embodiments may not train the discriminative models. Once the generative models are partially trained, the adversarial training may start where the discriminative model continues to train with input images from the generative models and with the training images 1053.

Note that training models 1020, 1022, and 1024 may involve training the models 1020, 1022, and 1024 with sufficient samples of training images 1053 for the generative and discriminative model pairs to reach, e.g., a Nash Equilibrium. The amount of training required for each of the models 1020, 1022, and 1024 may depend on the type of template upon which the models 1020, 1022, and 1024 will generate and discriminate images. For example, some embodiments may train to generate images on a template that includes a background image. The background image, as discussed herein, includes features that are not part of the images for which each of the models 1020, 1022, and 1024 are trained to generate. In other words, the background image may comprise, e.g., a clean document with text and/or images, a picture, and/or the like. Such embodiments may require hundreds of thousands of training images for each model due to the nature of the training. In particular, with a background image, the discriminative models have to train to distinguish features of the background image from features that are part of the training. Such training images may include, e.g., multiple variations of background images with multiple variations of the feature(s) that the models 1020, 1022, and 1024 are training to generate. The background images effectively provide patterns of noise that the discriminative models learn to disregard while learning to identify and map features that are the subject of the training images 1053.

Other embodiments may train with a template that comprises a blank image background. The blank image background, as discussed herein, may comprise a blank template for creating an image. For instance, the blank image background may have a size and/or shape but has no images or has an effectively featureless image for a background such as a transparent background, which advantageously provides minimal noise or no noise during the training. In such embodiments, the discriminative models may more quickly identify and map the features due to the absence of patterns of features that may effectively represent noise. For embodiments that use a blank image background as a background, the models may require, e.g., thousands or tens of thousands of training images 1053 for each of the models 1020, 1022, and 1024.

Upon completion of the training for the models 1020, 1022, and 1024, a customer, represented herein by a customer device 1040, may transmit one or more template(s) 1045 and may request generation of one or more new images 1055 by the image creation logic circuitry 1015. Depending on the embodiment, the customer may have more or less options related to generation of the new images 1055 and may or may not be able to set parameters related to generation of the new images 1055. For instance, some embodiments may include default settings for generation of new images 1055 based on the template(s) 1045 provided and the customer may be able to change the default settings. In other embodiments, the settings for the generation of the new images 1055 may be established and the customer may submit one or more template(s) 1045 to begin generation of the new images 1055. In still other embodiments, the image creation logic circuitry 1015 may supply the template(s) 1045 and the customer may or may not have a choice between the use of the template(s) 1045 with background images and the template(s) with blank image backgrounds for generation of the new images 1055.

In an example embodiment, the customer device 1040 may transmit one or more template(s) 1045 that include clean documents along with a request to generate a set (e.g., one hundred, one thousand, ten thousand, etc.) degrade documents as new images based on the templates. Clean documents refer to documents that have text and/or images and a well-defined background without, e.g., fingerprints, smudges, dirt, other artifacts, and the like. The customer, for instance, may require a large set of training images for another project. In some of these embodiments, the customer may also request that the image creation logic circuitry 1015 generate the new images based on a random selection of a number of models, such as the models 1020, 1022, and 1024, that is between 2 models and 20 models to vary and limit the amount of degradation of the documents in the new images.

Upon receipt of the request from the customer device 1040, the image creation logic circuitry 1015 may select a random, or non-deterministic, or probabilistic (and the like) set of models such as the models 1020, 1022, and 1024 from a set of models or library of models that relate to degradation of documents and may begin to generate the new images 1055 with the models. In some embodiments, the image creation logic circuitry 1015 may select a different number and set of models for each of the template(s) 1045 or may divide the total number new images requested into groups and select a different set of models for each group to generate the new images 1055. In one embodiment, the image creation logic circuitry 1015 may determine multiple different selections of models for each of the template(s) 1045 either randomly or through parameter settings requested by the customer device 1040.

In some embodiments, the image creation logic circuitry 1015 may employ a single system architecture for models, such as the models 1020, 1022, and 1024, for generation of the new images 1055. In other embodiments, the image creation logic circuitry 1015 may randomly select one or more system architectures or select one or more system architectures based on input from the customer device 1040. The system architectures may include architectures such as the image creation logic circuitry 1300 and 1400 shown in FIGS. 1D and 1E. For instance, the image creation logic circuitry 1015 may determine an order for layering synthetic images on the one or more template(s) 1045 by ordering the models, such as the models 1020, 1022, and 1024, in series. In other words, model 1020 may receive one of the templates 1045 and generate a first synthetic image on the template. The image creation logic circuitry 1015 may provide the first synthetic image as an input to the model 1022. The model 1022 may generate a second synthetic image on the first synthetic image. The image creation logic circuitry 1015 may provide the second synthetic image as an input to the model 1024 and the model 1024 may generate a third synthetic image on the second synthetic image to, e.g., create the new images 1055 if only three models are selected for generation of the new images 1055. If more or less models are selected, the last model in the series of models will generate the last synthetic image on the second to last synthetic image to create the new images based on the template(s) 1045.

As another example of the system architecture, the image creation logic circuitry 1015 may select a number of models from the set of models pretrained by the image creation logic circuitry 1015. The image creation logic circuitry 1015 may provide a blank image background to each of the models concurrently, such as the models 1020, 1022, and 1024. The models may independently and simultaneously generate synthetic images based on their training. Thereafter, the image creation logic circuitry 1015 may provide the outputs of the models to an overlay model. The overlay model may combine the synthetic images with one or more of the template(s) 1045. In some embodiments, the overlay model may comprise an application to generate a drawing structure that includes one of the template(s) 1045 as a base layer and the synthetic images as layers above the base layer to effectively filter the base image of one of the template(s) 1045 with the synthetic images to create the new images 1055. In another embodiment, the overlay model may generate the synthetic images on the base layer in an order selected by the image creation logic circuitry 1015 or via a parameter set by the customer device 1040 to create the new images 1055. In still other embodiments, the overlay model may comprise an overlay GAN trained to combine the synthetic images with the base image of one of the template(s) 1015 to generate the new images 1055.

The overlay GAN may train in a similar manner as discussed with respect to the other models but may train with various training documents that have multiple combinations of the features generated by the models 1020, 1022, and 1024 as discussed above.

FIG. 1B depicts an embodiment for an apparatus 1100 such as one of the server(s) 1010 shown in FIG. 1A. The apparatus 1100 may be a computer in the form of a smart phone, a tablet, a notebook, a desktop computer, a workstation, or a server. The apparatus 1100 can combine with any suitable embodiment of the systems, devices, and methods disclosed herein. The apparatus 1100 can include processor(s) 1110, a non-transitory storage medium 1120, communication interface 1130, and a display 1135. The processor(s) 1110 may comprise one or more processors, such as a programmable processor (e.g., a central processing unit (CPU)). The processor(s) 1110 may comprise processing circuitry to implement image creation logic circuitry 1115 such as the image creation logic circuitry 1015 in FIG. 1A.

The processor(s) 1110 may operatively couple with a non-transitory storage medium 1120. The non-transitory storage medium 1120 may store logic, code, and/or program instructions executable by the processor(s) 1110 for performing one or more instructions including the image creation logic circuitry 1125. The non-transitory storage medium 1120 may comprise one or more memory units (e.g., removable media or external storage such as a secure digital (SD) card, random-access memory (RAM), a flash drive, a hard drive, and/or the like). The memory units of the non-transitory storage medium 1120 can store logic, code and/or program instructions executable by the processor(s) 1110 to perform any suitable embodiment of the methods described herein. For example, the processor(s) 1110 may execute instructions such as instructions of image creation logic circuitry 1125 causing one or more processors of the processor(s) 1110 represented by the image creation logic circuitry 1115 to train models to generate a model library for the image creation logic circuitry 1115 and to perform inference computations, by neural networks such as GANs of the image creation logic circuitry 1115 based on base images or templates to create new images. The inference computations by each of the neural networks may generate a synthesized mapping of one or more synthesized features to a synthetic image based on training with training images that include the one or more features. The pretraining of each of the neural networks may include training with a number of images that include the one or more features and no additional attributes, to advantageously reduce the amount of training required for each of the neural networks. In other embodiments, the pretraining of each of the neural networks may include training with a number of images that include the one or more features plus attributes associated with a background image such as a document with text and/or images to advantageously account for effects of the attributes in base images on the definition of the one or more features.

When the neural network creates the new images, the image creation logic circuitry 1115 may cause the new images to display on a display device 1135 and/or store the new image(s) 1127 in the storage medium 1120. In some embodiments, the storage medium 1120 may also comprise memory units that comprise shared memory to store inputs and outputs of layers of the neural network for computation by the processor(s) 1110. In some embodiments, the memory units of the non-transitory storage medium 1120 may store the intermediate images created by the neural networks, at least temporarily, during the creation of the new image(s) 1127 by the processor(s) 1104.

The processor(s) 1110 may couple to a communication interface 1130 to transmit and/or receive data from one or more external devices (e.g., a terminal, display device, a smart phone, a tablet, a server, or other remote device). The communication interface 1130 includes circuitry to transmit and receive communications through a wired and/or wireless media such as an Ethernet interface, a wireless fidelity (Wi-Fi) interface, a cellular data interface, and/or the like. In some embodiments, the communication interface 1130 may implement logic such as code in a baseband processor to interact with a physical layer device and antenna array to transmit and receive wireless communications such as the new image(s) 1127 from a server or an instance of a neural network of the image creation logic circuitry 1115 and 1125 from the data server(s) 1050. For example, the communication interface 1130 may implement one or more of local area networks (LAN), wide area networks (WAN), infrared communications, radio communications, Wi-Fi, point-to-point (P2P) networks, telecommunication networks, cloud communication, and the like.

The processor(s) 1110 may couple to a display device 1135 to display a message or notification via graphics, video, text, and/or the like. In some embodiments, the display device 1135 may comprise a display on a terminal, a display device, a smart phone, a tablet, a server, or a remote device.

Figure 1C:
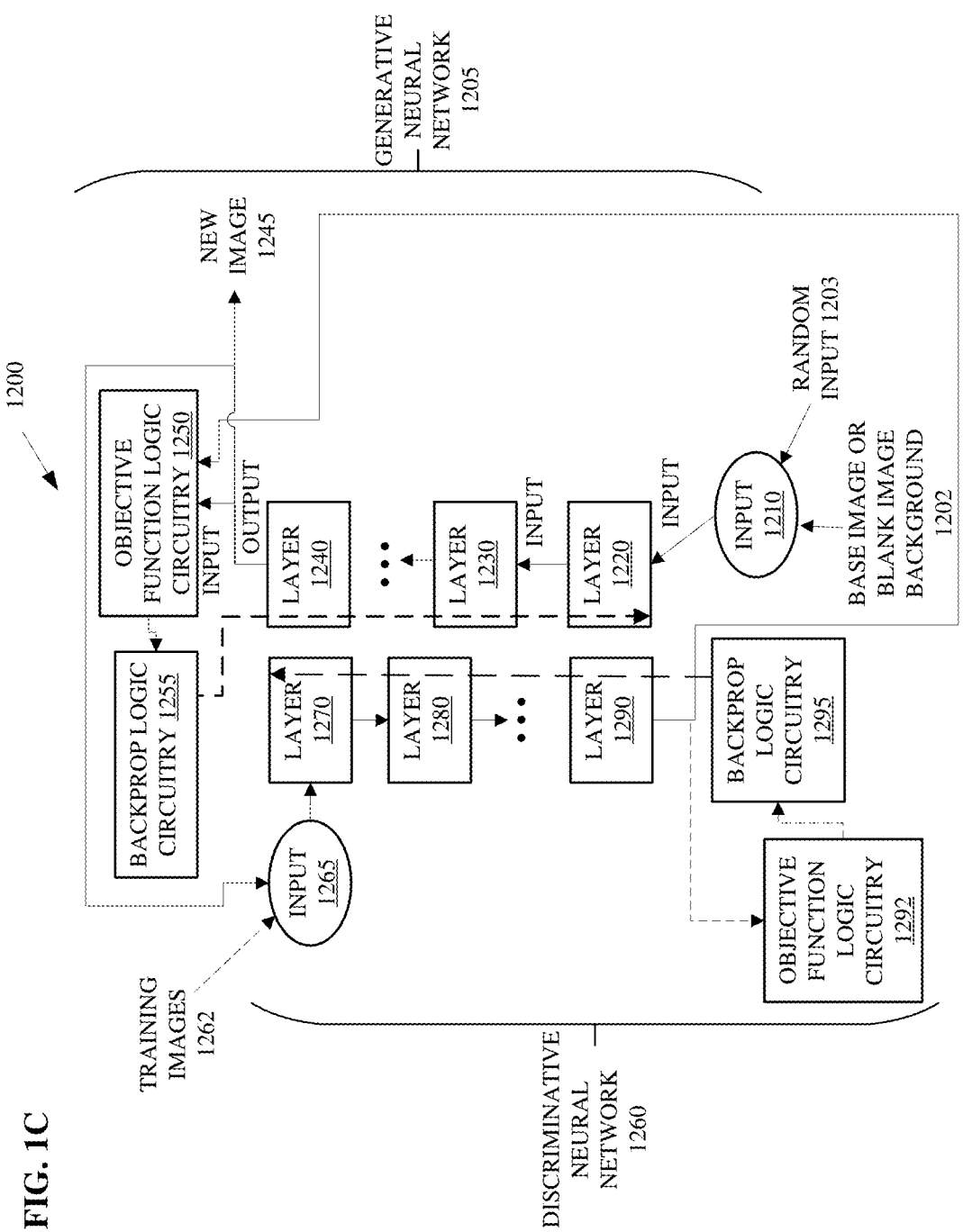
FIG. 1C depicts an embodiment of a generative adversarial network (GAN) of an image creation logic circuitry, such as the models of the image creation logic circuitry illustrated in FIGS. 1A-1B.

FIG. 1C depicts an embodiment of a generative adversarial network (GAN) 1200 of an image creation logic circuitry, such as models of the image creation logic circuitry illustrated in FIGS. 1A-1B. A GAN is a framework for estimating generative models via an adversarial process, in which two models simultaneously train: a generative neural network 1205 that creates a training data distribution and a discriminative neural network 1260 that estimates the probability that a sample image came from the training images rather than the generative neural network 1205. The training procedure for the generative neural network 1205 is to maximize the probability of the discriminative neural network 1260 making a mistake. The generative neural network 1205 may train to determine the training data distribution and the discriminative neural network 1260 may train with the data distribution to determine portions of the features that the generative neural network 1205 has not determined. In some embodiments, the generative neural network 1205 and the discriminative neural network 1260 may comprise Long Short-Term Memory (LSTM) neural networks, convolutional neural networks (CNNs), multilayer perceptrons, or the like.

An LSTM is a basic deep learning model and capable of learning long-term dependencies. A LSTM internal unit is composed of a cell, an input gate, an output gate, and a forget gate. The LSTM internal units have a hidden state augmented with nonlinear mechanisms to allow the state to propagate without modification, be updated, or be reset, using simple learned gating functions.

A multilayer perceptron (MLP) is a class of feedforward artificial neural network. An MLP consists of, at least, three layers of nodes: an input layer, a hidden layer and an output layer. Except for the input nodes, each node in the MLP is a neuron that uses a nonlinear activation function.

A CNN is a class of deep, feed-forward artificial neural networks. A CNN may comprise of an input layer and an output layer, as well as multiple hidden layers. The hidden layers of a CNN typically consist of convolutional layers, pooling layers, fully connected layers, and normalization layers.

The GAN 1200 may generate a new image 1245 as an output that is synthesized based on training. The GAN 1200 may generally map features for a class of images. For example, the class of images may comprise smudges on a document to imitate a document that has been copied and/or scanned multiple times. The GAN 1200 may generate the smudges based on training with actual images of smudges or a quality set of synthesized images of smudges. In some embodiments, the GANs 1200 may train with a blank image background as an input and, in other embodiments, the GANs 1200 may train with smudges on multiple variations of background images such as the base image of a template. In some embodiments, the smudges may effectively comprise a filtered version of the base image. In other embodiments, the smudges may comprise images of pixels of various colors and translucencies added to the base image. In still other embodiments, the smudges may comprise an interaction of pixels within the base image that changes colors, shades, brightness, contrast, and/or translucencies of pixels in the base image.

The generative neural network 1205 of the GAN 1200 may begin training after some training with actual images by the discriminative neural network 1260 and through interaction with the discriminative neural network 1260. The generative neural network 1205 may begin creation of images based on the random input 1203 and a transfer function, G(z), that the discriminative neural network recognizes, to some degree, as features (x) that map to a smudge. During this iterative process, the generative neural network 1205 may adjust the transfer function G(z) to map out features in the image space on the background image or blank image background 1202 that include features of smudges.

The GAN 1200 includes an input layer 1210 to receive input data such as a background image or blank image background 1202 as well as a random input 1203 such as a random number or a portion of a probability distribution, such as a Gaussian distribution, in the form of a tensor. In some embodiments, image creation logic circuitry may divide the template or blank image background 1202 into more than one portions and input each portion of the input image in multiple, serial tensors.

The input layer 1210 may receive the input data to train the GAN 1200 and/or for generation of a new image. In some embodiments, the input data is not modified by back-propagation. The layer 1220 may compute an output and pass the output of the layer 1220 to the input of layer 1230. Layer 1230 may determine an output based on the input from layer 1220 and pass the output to the next layer.

The layer 1240 may generate an output in the form of a synthetic image. In inference mode, the generative neural network 2105 may output a new image 1245 or a portion thereof to a data storage. In some embodiments, during training and in inference mode, the generative neural network 2105 may output an image or a portion thereof to the objective function logic circuitry 1250 and to the input layer 1265 of the discriminative neural network 1260 to continue training with the discriminative neural network 1260. In other embodiments, the training may freeze during inference mode and the generative neural network 2105 may only output a new image 1245 or a portion thereof to a data storage or other device.

The discriminative neural network 1260 may receive the image output by the generative neural network 1205 at an input layer 1265 of the discriminative neural network 1260. In some embodiments, the discriminative neural network 1260 may also receive training images 1262 at an input layer 1265. Image creation logic circuitry may select between provision of the training images 1262 and provision of the output image from the generative neural network 1205 at the input for the discriminative neural network 1260 to continue the training of the discriminative neural network 1260. Switching between provision of the training images and the synthetic images from the generative neural network 1205 may continue the training of the discriminative neural network 1260 to map features of the smudges in the training images 1262 between evaluations of synthetic images generated by the generative neural network 1205.

The layer 1270 may compute an output and pass the output of the layer 1270 to the input of layer 1280. Layer 1280 may determine an output based on the input from layer 1270 and pass the output to the next layer.

The layer 1290 may generate an output and pass the output to an objective function logic circuitry 1292 as well as to the objective function logic circuitry 1250 of the generative neural network 1205. The objective function logic circuitry 1292 may determine errors in the output from the layer 1290 of the discriminative neural network 1260 based on an objective function. For instance, when the image creation logic circuitry selects a training image 1262 to input at the input layer 1265, the objective function logic circuitry 1292 may determine a gradient of the objective function and backpropagate the gradient through the layers 1290 through 1270 to adjust the transfer function, D(x), represented by functions in the layers via the backprop logic circuitry 1295.

In contrast, when the image creation logic circuitry selects the synthetic image output from the generative neural network 1205 as input at the input layer 1265, the output of the layer 1290 may pass to the objective function logic circuitry 1250 and/or the objective function logic circuitry 1292 to backpropagate a gradient of the objective function of the objective function logic circuitry 1250 through the generative neural network 1205 and/or backpropagate a gradient of the objective function of the objective function logic circuitry 1292 through the discriminative neural network 1260. For instance, the objective function logic circuitry 1250 may determine, based on the image output by the generative neural network 1250 and the output of the layer 1290 of the discriminative neural network 1260, a gradient of the objective function associated with the image output. The objective function logic circuitry 1250 may pass the gradient to the backprop logic circuitry 1255 to backpropagate the gradient of the objective function through the layers 1240 through 1220 of the generative neural network 1205. Furthermore, the objective function logic circuitry 1292 may advantageously, in some embodiments, backpropagate via backprop logic circuitry 1295, a correct evaluation of the synthetic image from the generative neural network 1205 to reinforce the correct evaluation of a difference between a feature in the synthetic image and a feature from the training images 1262.

The backpropagation logic circuitry 1255 may propagate the gradient of the objective function of the objective function logic circuitry 1250 from the top-most layer, layer 1240, to the bottom-most layer, layer 1220 using the chain rule. The chain rule is a formula for computing the derivative of the composition of two or more functions. That is, if f and g are functions, then the chain rule expresses the derivative of their composition f ∘ g (the function which maps x to f(g(x))) in terms of the derivatives of f and g. After the objective function logic circuitry 1250 computes the errors, backpropagation logic circuitry 1255 backpropagates the errors to adjust weights and biases associated with the functions. The backpropagation is illustrated with the dashed arrows.

Figure 1E:
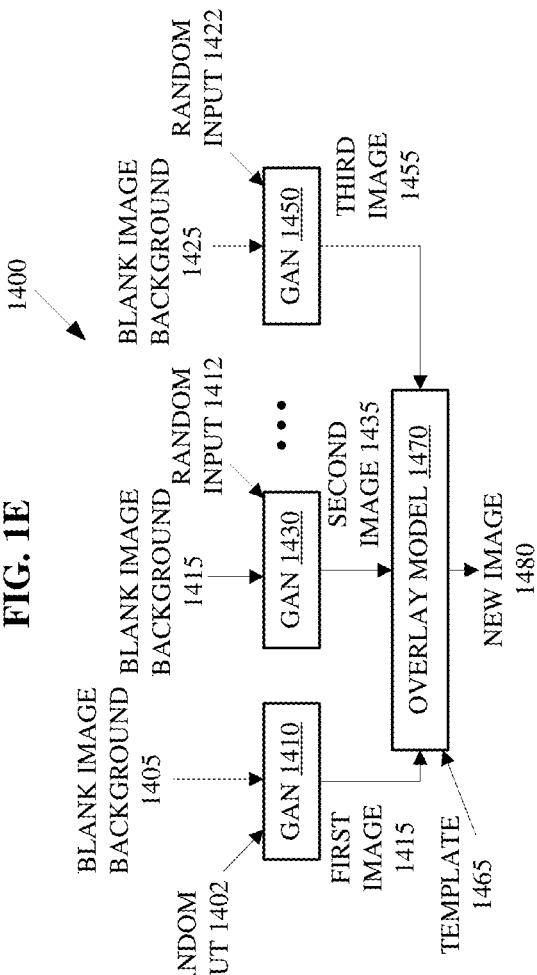
FIGS. 1D-E depict embodiments of image creation logic circuitry including GANs to create new images, such as image creation logic circuitry illustrated in FIGS. 1A-1B and the GAN shown in FIG. 1C.
Figure 1D:
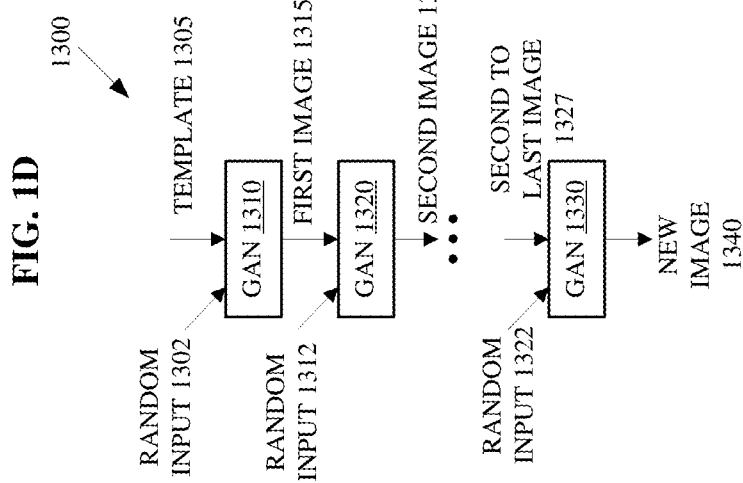

FIGS. 1D-E depict embodiments of image creation logic circuitry including GANs to create new images, such as image creation logic circuitry illustrated in FIGS. 1A-1B and the GAN shown in FIG. 1C. FIG. 1D illustrates a system architecture 1300 of image creation logic circuitry. The system architecture 1300 illustrates an arrangement for two or more GANs selected by the image creation logic circuitry to generate a new image. The present embodiment includes GANs 1310, 1320, through 1330 interconnected in series. The GANs 1310, 1320, through 1330 are pretrained independently as individual GANs and may or may not perform additional training interconnected in the system architecture 1300. In some embodiments, the GANs 1310, 1320, through 1330 are trained with background images at the input layers of the GANs 1310, 1320, through 1330.

The GAN 1310 may receive as inputs, a random input 1302 and a template 1305 at the input layer. The GAN 1310 may create a first image 1315 with one or more features on the template 1305. The GAN 1310 may generate the one or more features based on the random input 1302 and may output the first image 1315 to the GAN 1320.

The GAN 1320 may receive a random input 1312 and the first image 1315 at the input layer of the GAN 1320 and may create a second image 1325 with one or more features on the first image 1315 based on the random input 1312. The GAN 1320 may output the second image 1325 to the next GAN in the series of GANs.

The last GAN in the series, GAN 1330, may receive the image output by the second to last GAN in the series along with a random input 1322 at the input layer of the GAN 1330. The GAN 1330 may create a new image 1340 by creation of one or more features on the second to last image 1327, based on the random input 1322. The GAN 1330 may then output the new image 1340 to, e.g., a data storage and/or another device. In some embodiments, the random inputs 1302, 1312, and 1322 are generated independently. In other embodiments, the random inputs 1302, 1312, and 1322 may be coordinated or may be the same inputs.

In some embodiments, the GANs 1310, 1320, through 1330 may include one or more instances of the same GAN from a model library. Such embodiments may, e.g., increase the number of the same one or more features associated with a GAN if two or more instances of the same GAN are implemented in the system architecture 1300. Furthermore, the likelihood of duplication of exactly the same one or more features is low if the random inputs are independently determined for the two instances and the likelihood of duplication of exactly the same features is nearly nil if the random inputs for the two or more instances of the same GAN are coordinated.

FIG. 1E illustrates an alternative system architecture 1400 of image creation logic circuitry. The system architecture 1400 illustrates an arrangement for two or more GANs selected by the image creation logic circuitry to generate a new image. The present embodiment includes GANs 1410, 1430, through 1450 interconnected with an overlay model 1470 in parallel. The GANs 1410, 1430, through 1450 may be pretrained independently as individual GANs. In example embodiments, the GANs 1410, 1430, through 1450 are trained with blank image backgrounds at the input layers of the GANs 1410, 1430, through 1450.

The GANs 1410, 1430, through 1450 may receive, in parallel, and in some embodiments, concurrently, the random inputs 1402, 1412, through 1422 and the blank image backgrounds 1405, 1415, through 1425, respectively, at the corresponding input layers of the GANs 1410, 1430, through 1450. The GAN 1410 may generate or create a first image 1415 by generation of one or more features on the blank image background 1405. The GAN 1430 may generate or create a second image 1435 by generation of one or more features on the blank image background 1415. And so on through the GAN 1450, which may generate or create a third image 1455 by generation of one or more features on the blank image background 1425. In some embodiments, the blank image backgrounds 1405, 1415, through 1425 are instances of the same blank image background and effectively provide a transparent or translucent background for their respective features. The random inputs 1402, 1412, through 1425 may be generated independently, may be coordinated, or may be the same, depending on parameters of the system architecture 1400.

The overlay model 1470 may receive as input, each of the images created by the GANs 1410, 1430, through 1450 including the first image 1415, the second image 1435, through the third image 1455, respectively. The overlay mode 1470 may also receive the template 1465 as an input. In some embodiments, the overlay model may receive corresponding portions of the images and the template in multiple stages. The template 1465 may comprise, e.g., a document with text and/or a background image. In some embodiments, the overlay model 1470 may receive the first image 1415, the second image 1435, through the third image 1455 concurrently but embodiments are not limited to concurrent operations of the GANs 1410, 1430, through 1450.

With receipt of one or more of the synthetic images from the GANs 1410, 1430, through 1450, the overlay model 1470 may, in some embodiments, create a drawing structure that includes the template 1465 as a background image on a bottom layer, and each of the first image 1415, second image 1435, through third image 1455 as layers above the bottom layer in the drawing structure. In some embodiments, the overlay model 1470 may set one or more or all parameters associated with each of the layers such as scaling, transparency, contrast, brightness, visibility, hue, and the like based on default settings, user settings, or through training. For instance, the overlay model 1470 may comprise an algorithm to assemble the drawing structure with the synthetic images (the first image 1415, second image 1435, through third image 1455) and the template 1465 in some embodiments. In other embodiments, the overlay model 1470 may comprise a machine learning model to assemble the drawing structure and may learn by training with training images that have the one or more of the features generated by each of the GANs 1410, 1430, through 1450. In such embodiments, the overlay model 1470 may comprise a GAN such as the GAN 1200 shown in FIG. 1C.

In some embodiments, the GANs 1410, 1430, through 1450 may include one or more instances of the same GAN from a model library. Such embodiments may, e.g., increase the number of the same one or more features associated with a GAN and the likelihood of duplication of exactly the same one or more features is low if the random inputs are independently determined for the two instances are different and is nearly nil if the random inputs for the two or more instances of the same GAN are coordinated.

Figure 2:
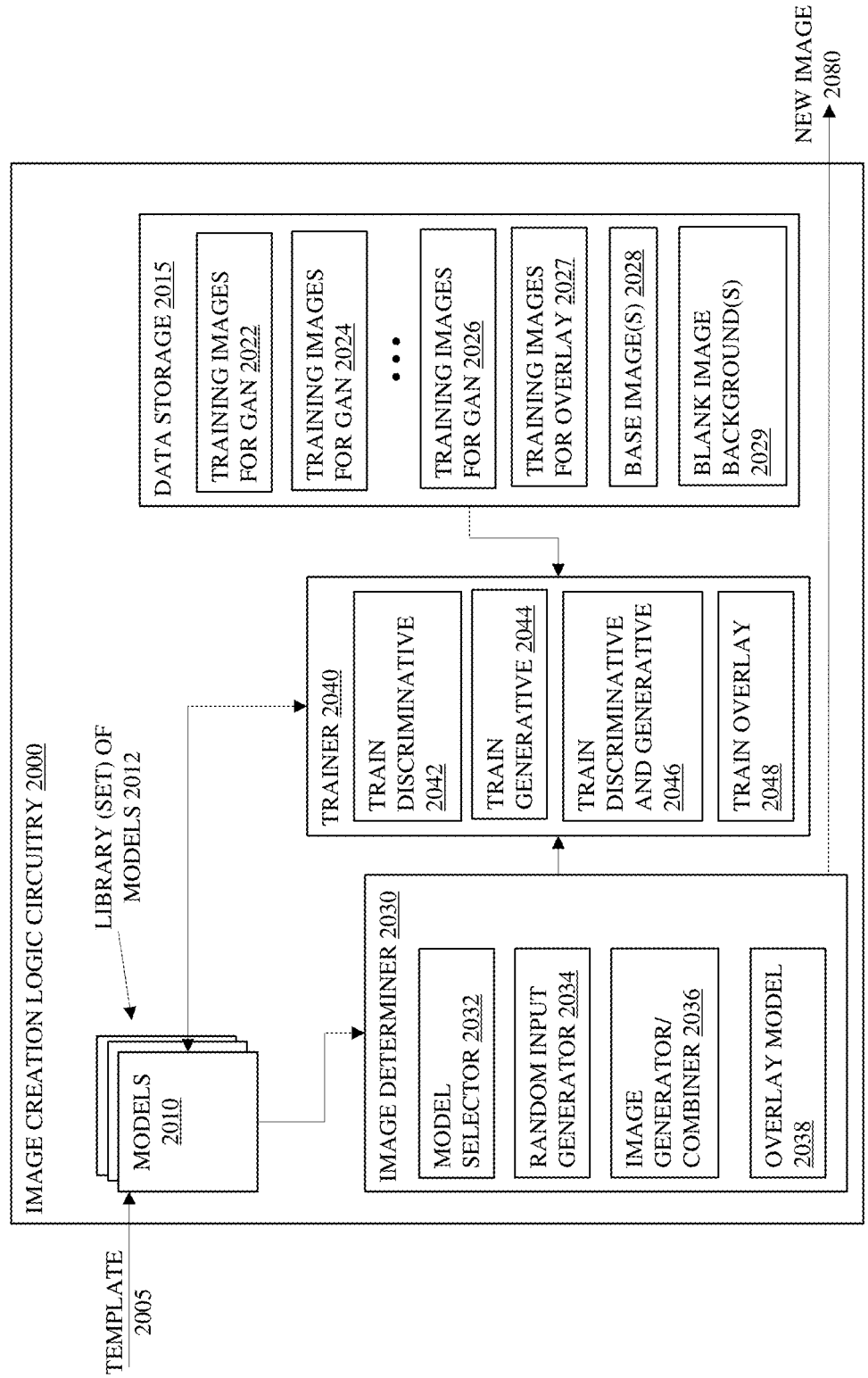
FIG. 2 depicts an embodiment of image creation logic circuitry, such as the image creation logic circuitry shown in FIGS. 1A-1B.

FIG. 2 depicts an embodiment of an image creation logic circuitry 2000 such as the image creation logic circuitry 1015 in FIG. 1A. The image creation logic circuitry 2000 may perform one or more operations to train models 2010 in a set or library of models 2012, such as the models 1020, 1022, and 1024 illustrated in FIG. 1A, the GAN 1200 in FIG. 1C, and the GANs in FIGS. 1D-E. The image creation logic circuitry 2000 may train the models 2010 to create new images based on a template, or base image, and may also implement two or more of the models 2010 in a system architecture such as the system architectures 1300 and 1400 shown in FIGS. 1D-E. Note that the library of models 2012 may comprise more than one subset of models such as models 2010 and each subset of the models may train for inclusion in different system architectures. For instance, the models 2010 may train for inclusion in the system architecture 1300 or may train for inclusion in the system architecture 1400.

In the present embodiment, the image creation logic circuitry 2000 may comprise an image determiner 2030 to create new images with pretrained models 2010 based on receipt of a template 2005. The image creation logic circuitry 2000 may also comprise a trainer 2040 to pretrain the models 2010 and a data storage 2015 to store training images for each of the models 2010, at least temporarily, as well as one or more base image(s) 2028 and one or more blank image background(s) 2029. For instance, the image creation logic circuitry 2000 may store all training images locally in the data storage 2015 or may cache training images in the data storage 2015 temporarily during training of the models 2010.

The image determiner 2030 may determine the system architecture for a subset of the models such as the models 2010 from the library of models 2012 to create a new image. The new image, as referred to herein, may comprise a synthetic image. In some embodiments, the image determiner 2030 may create the new image on a background image such as a document with text and/or images, or the like. In other embodiments, the image determiner 2030 may create the new image on a blank image background.

In some embodiments, the image determiner 2030 may select a system architecture based on a parameter provided by a user, a default parameter for the type of system architecture, or a randomly selected system architecture. In other embodiments, the image determiner 2030 may have one system architecture for creating the new image.

The image determiner 2030 may comprise a model selector 2032, a random input generator 2034, an image generator/combiner 2036, and, in some embodiments, an overlay model 2038. The model selector 2032 may select two or more models 2010 to include in a system architecture to generate the new image. In some embodiments. the model selector 2032 may select the two or more models 2010 at random. In some embodiments, the model selector 2032 may select the two or more models 2010 from a subset of the library of models 2012 trained for inclusion in a particular type of system architecture such as the system architectures 1300 and 1400 shown in FIGS. 1D-E. In further embodiments, the model selector 2032 may select a random number of the models 2010 at random based on parameters provided by a user or parameters related to the training of the models 2010. For instance, a user or a preference setting may indicate that the selection of the models 2010 may include between, e.g., 2 and 20 models or 5 and 30 models, or the like. In such embodiments, the model selector 2032 may select a number of models within that range. The parameters may also include selection of one or more background images, one or more intermediate images, one or more foreground images, and/or the like. In response, the model selector 2032 may select the models 2010 in accordance with the parameters and/or may select the models at random in accordance with the parameters.

After the model selector 2032 selects the models 2010 and the image determiner 2030 establishes the system architecture, the random input generator 2034 may determine a random input for the models 2010. The random input may comprise one or more random numbers, a random selection from a probability distribution such as a normal distribution, or the like. Furthermore, the random input generator 2034 may determine random input for each of the models 2010 independently or may coordinate generation of the random inputs. For instance, parameters provided by a user or as a default may, in some embodiments, allow random selection of the same model more than once for inclusion in the system architecture. The random input generator 2034 may coordinate the random inputs of the models to ensure that two instances of the same model do not receive the same random input for generation of the new image.

The image generator/combiner 2036 may facilitate generation of new images by the models 2010. The image generator/combiner 2036 may load the two or more models 2010 for execution and provide each of the models 2010 with appropriate inputs for generation of the new image in accordance with the system architecture determined by the image determiner 2030. For instance, if the system architecture is similar to the system architecture 1300 in FIG. 1D, the image generator/combiner 2036 may provide the random input from the random input generator 2034 and the template 2005 to the first model of the models 2012 in the series of the models 2010 for generation of the new image.

The image generator/combiner 2036 may also determine the order of the models based on parameters related to models and/or determine a random order for the models 2010. For instance, the image generator/combiner 2036 may insert models that generate a background prior to models that generate a foreground in the series of the models 2010.

Furthermore, the image generator/combiner 2036 may provide the output images from the models 2010 as input images to each successive model in accordance with the order of the models 2010 in the system architecture.

With respect to system architectures such as the system architecture 1400, the image generator/combiner 2036 may load one or more of the selected models 2010 for execution, depending on resources available to execute the models, and may provide a random input as well as one of the blank image background(s) 2029 from the data storage 2015 for each of the models 2010. Furthermore, the image generator/combiner 2036 may provide the output images from the models 2010 as input images to the overlay model 2038.

The overlay model 2038 may comprise an algorithm or machine learning model such as a GAN to combine the images output from each of the models 2010 in accordance with the system architecture such as the system architecture 1400. The overlay model 2038 may generate the new image by combining the images output from each of the models 2010 with a template or base image. In some embodiments, the overlay model 2038 may order the layers of the synthetic images output by the models 2010 in accordance with an order established by parameters associated with the images. In some embodiments, the overlay model 2038 may determine the order for the images by randomly determining or selecting the order or randomly selecting the order in accordance with one or more of the parameters. In one embodiment, the overlay model 2038 may comprise a GAN to determine an order or an order in accordance with some parameters. Furthermore, the overlay model 2038 may output the new image as a drawing structure comprised of multiple layers of the images output by the models 2010 and the template 2005 or may combine the images output by the models 2010 into a single layer.

The trainer 2040 may train the models 2010 in the library of models 2012. In some embodiments, the models 2010 comprise GANs. The trainer 2040 may train the GANs in multiple stages and may comprise multiple stages of training including train discriminative 2042, train generative 2044, train discriminative and generative 2046, and, in some embodiments, train overlay 2048.

The train discriminative 2042 may freeze training of the generative model of a GAN of each of the models 2010 as a first stage for training each GAN. The train discriminative 2042 may train the discriminative model of each GAN with a corresponding set of training images such as the training images for GAN 2022, the training images for GAN 2024, or the training images for GAN 2026. For instance, a first GAN of a first model of the models 2010 may train with multiple epochs of the training images for GAN 2022 to provide a basis for the discriminative model to map similar features in each of the training images for GAN 2022. Freezing of the training of the generative model means that the discriminative model will receive the training images, map the features, and output a prediction, probability, or classification for the training image as including features D(x) or not and feedback errors related to the determination. The training images for GAN 2020 may include documents that include the features as well as documents that do not include the features and such information is provided as an input for an objective function logic circuitry of the discriminative model so the discriminative model can backpropagate gradients for the erroneous evaluations and/or the correct evaluations.

After training the discriminative model of the first GAN for multiple epochs, the trainer 2040 may freeze the training of the discriminative model of the first GAN to train the generative model of the first GAN for multiple epochs. The number of epochs for training the discriminative model and the generative model may be implementation specific and may be based on various factors such as the complexity of the features included in the training images for GAN 2020, whether the training images for GAN 2020 include a background image that is not part of the features, and/or the like.

During the training of the generative model of the first GAN and while training of the discriminative model is frozen, the generative model may receive one or more base image(s) 2028 as well as a random input at the input layer of the generative model of the first GAN. The generative model may learn to generate the features from the training images on the base image(s) 2028 based on a random input. A base image may comprise a background image or may comprise a blank image background.

The trainer 1040 may provide the output of the generative model of the first GAN as an input for the discriminative model of the first GAN. Even though training of the discriminative model may be frozen, the discriminative model may evaluate the images created by the generative model and output a prediction, probability, or classification to the objective function of the generative model to backpropagate error related to the image created by the generative model.

After training both the discriminative model and the generative model of the first GAN individually, the train discriminative and generative 2046 may train both the discriminative model and the generative model concurrently. For instance, the trainer 2040 may repeatedly switch between providing training images and synthetic images created by the generative model to the discriminative model so that the discriminative model continues to map features from the training images for GAN 2020 while providing feedback to the generative model on synthetic images generated by the generative model. This training process is the adversarial aspect of the GAN because, as the generative model learns to generate the features (x), the discriminative model continues to learn the features (x) from the training images with more specificity. In some embodiments, the discriminative model and the generative model of the first GAN may reach a Nash Equilibrium such that the models continue to learn as opposed to a situation in which the generative model always creates images that the discriminative model evaluates as real or the discriminative model always evaluates the synthetic images from the generative model as fake. This training may require thousands or tens of thousands of training images if the first GAN trains with a training images that include the features on a blank image background and the generative model creates features on a blank image background. This training may require hundreds of thousands of training images if the first GAN trains with training images that include the features on a background image and the generative model creates features on a background image.

The trainer 2040 may train the remainder of the GANs of the models 2010 similarly to the first GAN. For instance, each of the remaining models may train with one of the training images for GAN 2024 through 2026 in multiple stages including train discriminative 2042, train generative 2044, train discriminative and generative 2046, and, in some embodiments, train overlay 2048.

In some embodiments, the trainer 2040 may also include train overlay 2048 to train for an overlay model 2038 such as a GAN. The trainer 2040 may train the overlay model 2038 with the training images for overlay 2027 in a manner similar to that described above. The training images for overlay 2027 may include training images that include multiple variations of the features that the models 2010 generate. The discriminative model of the overlay model 2038 may map the features and the generative model may learn to combine the features given a set of images. Each training image may include features that may be generated by one of the models 2010. In such embodiments, the overlay model 2038 may learn an order with which to combine each image in the set of images, as well as, possibly learn other parameters such as brightness, translucency, scaling, contrast, hue, and/or the like. The generative model of the overlay model 2038 may learn to combine the set of images by selecting the order and parameters based on a random input.

The data storage 2015 may comprise training images for GAN 2020, and training images for GAN 2024, through training images for GAN 2026. In some embodiments, the training images for GAN 2022, and 2024, through 2026 each comprise training images that include one, different subset of the features that the image determiner 2030 may use to create a new image. For instance, the training images for GAN 2022 may have training images that include features of various fingerprints for degradation of background images or may include features of different horizons for generation of a background image of an outdoor scene. The training images for GAN 2024 may have training images that include features of different smudges for degradation of background images or may include features of various mountains for generation of an intermediate image of an outdoor scene. The training images for additional GANs may have training images that include features of different dirt markings for degradation of background images or may include features of various lakes with reflections of a mountain for generation of another intermediate image of an outdoor scene. And the training images for GAN 2026 may have training images that include features of different coffee stains for degradation of background images or may include features of various trees for generation of a foreground image of an outdoor scene. Note that, in some embodiments, such as training images for GANs 2022, 2024, through 2026 and/or models 2010 trained with such training images may be identified or tagged as part of a subset of images for background layers, intermediate image layers, foreground layers, and/or the like, to provide guidance for ordering of layers of the synthetic images generated or for ordering of generation of the synthetic images on a base image, depending on the system architecture associated with the models 2010. In such embodiments, the image determiner 2030 may select models, generate images, and/or combine images based on the identifications or tags for the ordering.

Figure 3B:
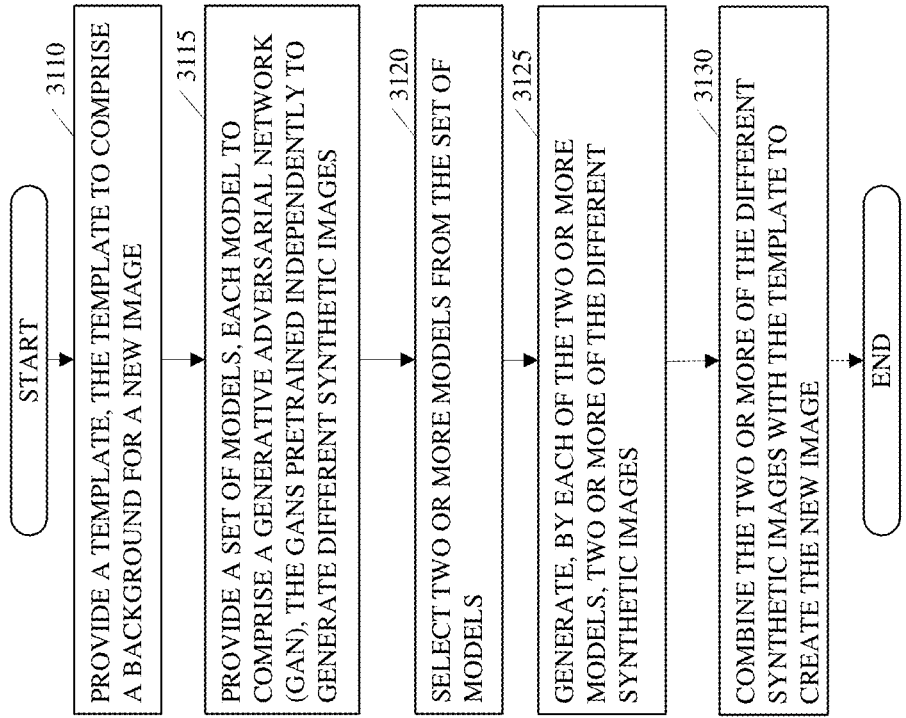
FIGS. 3A-B depict flowcharts of embodiments of image creation logic circuitry to pretrain GANs and perform image creation with GANs, such as the image creation logic circuitry shown in FIGS. 1A-1B and the GAN shown in FIG. 1C.
Figure 3A:
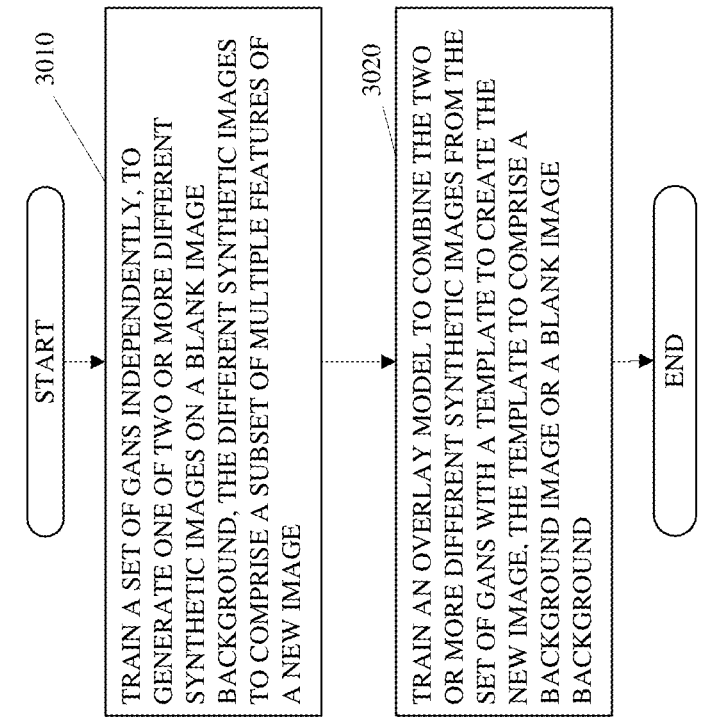

FIGS. 3A-B depict flowcharts of embodiments of image creation logic circuitry to pretrain GANs and perform image creation with GANs, such as the image creation logic circuitry shown in FIGS. 1A-1B and the GAN shown in FIG. 1C. FIG. 3A illustrates a flowchart to pre-train a set of GANs and pretrain an overlay model to create a new image. The flowchart starts with training a set of GANs independently, to generate one of two or more different synthetic images on a blank image background, the different synthetic images to comprise a subset of multiple features of a new image (element 3010). In other words, some embodiments separate an image that is desired as an output from a model, such as a GAN, into multiple portions or subsets of features and train each GAN in a set of GANs to create or generate the subset of the features on a blank image background. The training may involve, for instance, placing multiple variations fingerprints on blank pages or transparencies to generate training images for fingerprints even though the overall goal is to create images with, e.g., fingerprints, dirt, smudges, tar marks, and the like. By creating concise images that have minor variations between the sets of features, the discriminative model can, advantageously, learn to map the features with less training than the training required for fingerprints on a document that includes text and/or other images. Furthermore, training of the generative model can converge more quickly based on the more precise evaluations by the discriminative model.

In addition to pretraining the GANs to generate one of two or more different synthetic images on a blank image background, some implementations include training an overlay model to combine the two or more different synthetic images from the set of GANs with a template to create the new image, the template to comprise a background image or a blank image background (element 3020). In some embodiments, the image creation logic circuitry may train the GANs with training materials that have blank image backgrounds as base images and may create synthetic images on blank image backgrounds. Then, an overlay model can learn a way to combine the images so the new image output from the overlay model has features of a real document that is degraded after multiple generations of scans or copies. The image creation logic circuitry may do so by training the overlay with the real documents. In such embodiments, the overlay model may train with a focus on mapping the relatively few differences (features) between documents due to layering of synthetic layers on the template rather than focusing on the how to distinguish the features from a background image, how to map the features, and how to create the features.

FIG. 3B illustrates a flowchart of a process for pretraining. The process begins with provision of a template, the template to comprise a background for a new image (element 3110). In other words, a user or the image creation logic circuitry selects a template from a group of templates to provide a template upon which a new image will be created with synthetic images generated by a set of models.

The image creation logic circuitry may also provide a set of models, each model to comprise a generative adversarial network (GAN). The GANs in the set may be pretrained independently to generate different synthetic images (element 3115). In other words, the present embodiment may maintain a library of models that include pretrained GANs and each of the GANs are pretrained to generate a synthetic image that is a subset of one or more features from a set of features that can be included in a new image.

With the set of models, the image creation logic circuitry may select two or more models from the set of models (element 3120). In some embodiments, after a template is provided, the image creation logic circuitry selects a group of models to create the new image. When the project involves creation of the multiple new images based on the template, the image creation logic circuitry can randomly select the group of models for each new image to generate multiple unique new images with the template. The group of models can include one instance of each of the models in the group of models selected or may include multiple instances of some of or all the models in the group of models selected.

Once the image creation logic circuitry selects the two or more models from the set of models, the image creation logic circuitry may generate, by the two or more models, two or more of the different synthetic images (element 3125) and combine the two or more of the different synthetic images with the base image to create the new image (element 3130). In other words, each model or each instance of a model can create one synthetic image that is different from the synthetic images generated by the other models in the selected group of models. For instance, the group of models may include one instance of the first model that creates a synthetic fingerprints image, two instances of the second model that each creates a different synthetic smudges image, one instance of the third model that creates a synthetic dirt image, and one instance of the fourth model that creates a synthetic tar image. While the two instances of second model may create the same synthetic smudges image if both models receive the same random input, example embodiments either independently select the random inputs for the two models or coordinate random inputs so that there is a low likelihood that two instances of the same model will create the same synthetic image.

The image creation logic circuitry may generate and combine the synthetic images in accordance with different system architectures such as the system architectures 1300 and 1400 shown in FIGS. 1D-E. In a first system architecture, the group of models generate and combine the synthetic images in series. For instance, a first model in the series generates a first synthetic image on the template provided. The second model in the series receives the output image from the first model and generates the second synthetic image on the first synthetic image, which includes the template. Thus, the last model in the series completes the process of generation and combination of the two or more different synthetic images by generating a synthetic image on the combination of the previously created synthetic images to output a new image.

In a second system architecture, the group of models generate and combine the synthetic images on blank image backgrounds and the synthetic images are combined with an overlay model on the template. In one variation of the second system architecture, the overlay model combines the synthetic images in a drawing structure that includes a layer for each of the synthetic images and a layer for the template. Such embodiments generate an output file with the drawing structure and the layers can later be edited to move layers or adjust the layers. This variation can be included in other variations of the second system architecture also.

In another variation or embodiment of the second system architecture, the overlay model combines the synthetic images via a GAN, allowing the GAN to choose one or more different parameters related to generation of the new image such as the order of the layering of the synthetic images on the template, brightness of each of the layers, contrast of each of the layers, scaling of each of the layers, and/or the like. The image creation logic circuitry may combine this variation with the drawing structure to allow subsequent editing of the parameters associated with the layers as well as editing of the ordering of the layers. In an alternative variation, the image creation logic circuitry may combine the synthetic images in a single layer with the template or in a single layer that is not the same layer as the template. Furthermore, embodiments are not limited to these examples, the image creation logic circuitry may combine any one or more of the synthetic images on a layer or include any one or more of the synthetic images on separate layers to generate a drawing structure with layers.

Figure 4:
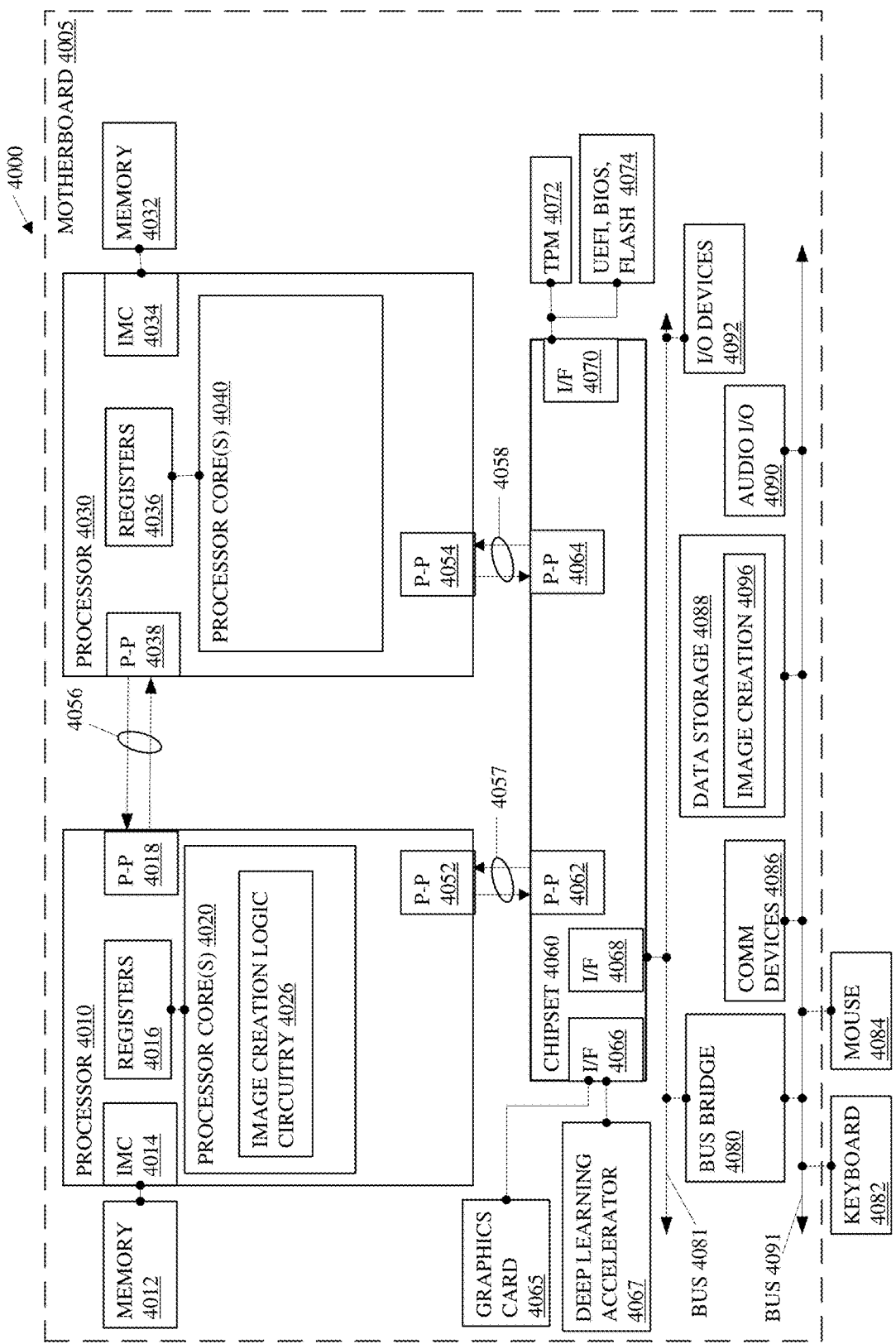
FIG. 4 depicts an embodiment of a system including a multiple-processor platform, a chipset, buses, and accessories such as the server shown in FIGS. 1A-1B.

FIG. 4 illustrates an embodiment of a system 4000. The system 4000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 4000 may have a single processor with one core or more than one processor. Note that the term "processor" refers to a processor with a single core or a processor package with multiple processor cores.

As shown in FIG. 4, system 4000 comprises a motherboard 4005 for mounting platform components. The motherboard 4005 is a point-to-point interconnect platform that includes a first processor 4010 and a second processor 4030 coupled via a point-to-point interconnect 4056 such as an Ultra Path Interconnect (UPI). In other embodiments, the system 4000 may be of another bus architecture, such as a multi-drop bus. Furthermore, each of processors 4010 and 4030 may be processor packages with multiple processor cores including processor core(s) 4020 and 4040, respectively. While the system 4000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 4010 and the chipset 4060. Some platforms may include additional components and some platforms may only include sockets to mount the processors and/or the chipset.

The first processor 4010 includes an integrated memory controller (IMC) 4014 and point-to-point (P-P) interconnects 4018 and 4052. Similarly, the second processor 4030 includes an IMC 4034 and P-P interconnects 4038 and 4054. The IMC's 4014 and 4034 couple the processors 4010 and 4030, respectively, to respective memories, a memory 4012 and a memory 4032. The memories 4012 and 4032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 4012 and 4032 locally attach to the respective processors 4010 and 4030. In other embodiments, the main memory may couple with the processors via a bus and shared memory hub.

The processors 4010 and 4030 comprise caches coupled with each of the processor core(s) 4020 and 4040, respectively. In the present embodiment, the processor core(s) 4020 of the processor 4010 include an image creation logic circuitry 4026 such as the image creation logic circuitry 1022 shown in FIG. 1B. The image creation logic circuitry 4026 may represent circuitry configured to implement the functionality of image creation for neural network support within the processor core(s) 4020 or may represent a combination of the circuitry within a processor and a medium to store all or part of the functionality of the image creation logic circuitry 4026 in memory such as cache, the memory 4012, buffers, registers, and/or the like. In some embodiments, the functionality of the image creation logic circuitry 4026 resides in whole or in part as code in a memory such as the image creation logic circuitry 4096 in the data storage unit 4088 attached to the processor 4010 via a chipset 4060 such as the image creation logic circuitry 1125 shown in FIG. 1B. The functionality of the image creation logic circuitry 4026 may also reside in whole or in part in memory such as the memory 4012 and/or a cache of the processor. Furthermore, the functionality of the image creation logic circuitry 4026 may also reside in whole or in part as circuitry within the processor 4010 and may perform operations, e.g., within registers or buffers such as the registers 4016 within the processor 4010, or within an instruction pipeline of the processor 4010.

In other embodiments, more than one of the processor 4010 and 4030 may comprise functionality of the image creation logic circuitry 4026 such as the processor 4030 and/or the processor within the deep learning accelerator 4067 coupled with the chipset 4060 via an interface (I/F) 4066. The I/F 4066 may be, for example, a Peripheral Component Interconnect-enhanced (PCI-e).

The first processor 4010 couples to a chipset 4060 via P-P interconnects 4052 and 4062 and the second processor 4030 couples to a chipset 4060 via P-P interconnects 4054 and 4064. Direct Media Interfaces (DMIs) 4057 and 4058 may couple the P-P interconnects 4052 and 4062 and the P-P interconnects 4054 and 4064, respectively. The DMI may be a high-speed interconnect that facilitates, e.g., eight Giga Transfers per second (GT/s) such as DMI 3.0. In other embodiments, the processors 4010 and 4030 may interconnect via a bus.

The chipset 4060 may comprise a controller hub such as a platform controller hub (PCH). The chipset 4060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 4060 may comprise more than one controller hub such as a chipset with a memory controller hub, a graphics controller hub, and an input/output (I/O) controller hub.

In the present embodiment, the chipset 4060 couples with a trusted platform module (TPM) 4072 and the unified extensible firmware interface (UEFI), BIOS, Flash component 4074 via an interface (I/F) 4070. The TPM 4072 is a dedicated microcontroller designed to secure hardware by integrating cryptographic keys into devices. The UEFI, BIOS, Flash component 4074 may provide pre-boot code.

Furthermore, chipset 4060 includes an I/F 4066 to couple chipset 4060 with a high-performance graphics engine, graphics card 4065. In other embodiments, the system 4000 may include a flexible display interface (FDI) between the processors 4010 and 4030 and the chipset 4060. The FDI interconnects a graphics processor core in a processor with the chipset 4060.

Various I/O devices 4092 couple to the bus 4081, along with a bus bridge 4080 which couples the bus 4081 to a second bus 4091 and an OF 4068 that connects the bus 4081 with the chipset 4060. In one embodiment, the second bus 4091 may be a low pin count (LPC) bus. Various devices may couple to the second bus 4091 including, for example, a keyboard 4082, a mouse 4084, communication devices 4086 and a data storage unit 4088 that may store code such as the image creation logic circuitry 4096. Furthermore, an audio I/O 4090 may couple to second bus 4091. Many of the I/O devices 4092, communication devices 4086, and the data storage unit 4088 may reside on the motherboard 4005 while the keyboard 4082 and the mouse 4084 may be add-on peripherals. In other embodiments, some or all the I/O devices 4092, communication devices 4086, and the data storage unit 4088 are add-on peripherals and do not reside on the motherboard 4005.

Figure 5:
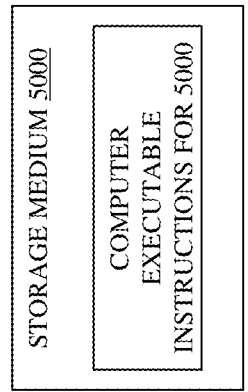
FIGS. 5-6 depict embodiments of a storage medium and a computing platform such as the server(s) shown in FIGS. 1A-B.

FIG. 5 illustrates an example of a storage medium 5000 to store training images, drawing structures, and/or the like to support the image creation logic circuitry. Storage medium 5000 may comprise an article of manufacture. In some examples, storage medium 5000 may include any non-transitory computer readable medium or machine readable medium, such as an optical, magnetic or semiconductor storage. Storage medium 5000 may store various types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
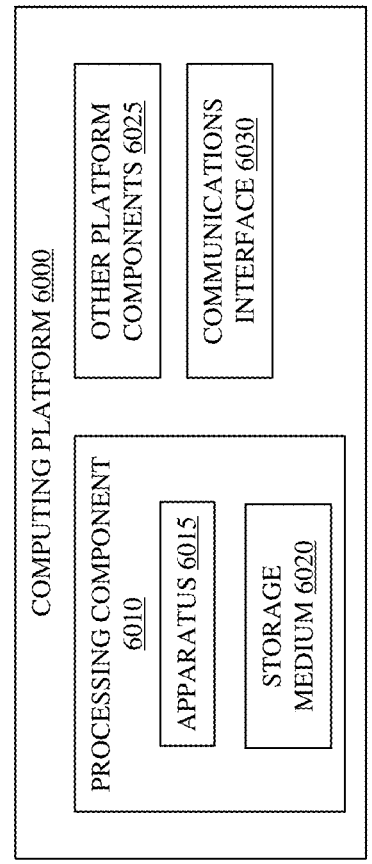

FIG. 6 illustrates an example computing platform 6000. In some examples, as shown in FIG. 6, computing platform 6000 may include a processing component 6010, other platform components or a communications interface 6030. According to some examples, computing platform 6000 may be implemented in a computing device such as a server in a system such as a data center or server farm that supports a manager or controller for managing configurable computing resources as mentioned above. Furthermore, the communications interface 6030 may comprise a wake-up radio (WUR) and may be capable of waking up a main radio of the computing platform 6000.

According to some examples, processing component 6010 may execute processing operations or logic for apparatus 6015 described herein such as the image creation logic circuitry 1115 illustrated in FIGS. 1A and 1B. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 6000 described herein, may be included or omitted in various embodiments of computing platform 6000, as suitably desired.

The components and features of computing platform 6000 may be implemented using any combination of discrete circuitry, ASICs, logic gates and/or single chip architectures. Further, the features of computing platform 6000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the exemplary computing platform 6000 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores", may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

What is claimed is:

1. A system comprising:
   memory; and
   logic circuitry coupled with the memory to:
      train a set of Generative Adversarial Networks (GANs) independently, each GAN of the set of GANs trained with separate sets of training images, each set of training images having at least one unique feature, each GAN comprising a set of computational layers, and each GAN trained to generate a different synthetic image on a blank image background; and
      train an overlay model to combine each of the different synthetic images with a template to create a new image, the template to comprise a background image or the blank image background.

2. The system of claim 1, wherein each of the different synthetic images to comprise one feature of multiple features of the new image.

3. The system of claim 1, wherein each GAN trained to map one or more features to one of the different synthetic images.

4. The system of claim 1, wherein the template comprises the background image, and at least a portion of training images of the sets of training images comprising attributes associated with the background image, the portion of training images including the attributes to account for effects of the attributes on the background image.

5. The system of claim 1, wherein the overlay model to comprise an application to generate the new image as a drawing structure with the template as a base layer and each one of the different synthetic images as a separate layer in the drawing structure.

6. The system of claim 1, wherein the overlay model to comprise an overlay GAN, the overlay GAN to overlay the template with each one of the different synthetic images in a determined order to create the new image, the overlay GAN to determine the determined order.

7. The system of claim 1, the combination of each of the different synthetic images to the template to comprise provision of the template as an input image to a first model of the set of GAN models in accordance with a determined order.

8. A computer-implemented method, comprising:
   training, by a computer system including memory and circuitry, a set of Generative Adversarial Networks (GANs) independently, each GAN of the set of GANs trained with separate sets of training images, each set of training images having at least one unique feature, each GAN comprising a set of computational layers, and each GAN trained to generate a different synthetic image on a blank image background; and
   training, by the system, an overlay model to combine each of the different synthetic images with a template to create a new image, the template to comprise a background image or the blank image background.

9. The computer-implemented method of claim 8, wherein each of the different synthetic images to comprise one feature of multiple features of the new image.

10. The computer-implemented method of claim 8, wherein each GAN trained to map one or more features to one of the different synthetic images.

11. The computer-implemented method of claim 8, wherein the template comprises the background image, and at least a portion of training images of the sets of training images comprising attributes associated with the background image, the portion of training images including the attributes to account for effects of the attributes on the background image.

12. The computer-implemented method of claim 8, wherein the overlay model to comprise an application to generate the new image as a drawing structure with the template as a base layer and each one of the different synthetic images as a separate layer in the drawing structure.

13. The computer-implemented method of claim 8, the overlay model to comprise an overlay GAN, the overlay GAN to overlay the template with each one of the different synthetic images in a determined order to create the new image, the overlay GAN to determine the determined order.

14. The computer-implemented method of claim 8, wherein the combination of each of the different synthetic images to the template to comprise provision of the template as an input image to a first model of the set of GAN models in accordance with a determined order.

15. A non-transitory storage medium containing instructions, which when executed by a processor, cause the processor to perform operations, the operations to:
   train a set of Generative Adversarial Networks (GANs) independently, each GAN of the set of GANs trained with separate sets of training images, each set of training images having at least one unique feature, each GAN comprising a set of computational layers, and each GAN trained to generate a different synthetic image on a blank image background; and
   train an overlay model to combine each of the different synthetic images with a template to create a new image, the template to comprise a background image or the blank image background.

16. The non-transitory storage medium of claim 15, wherein each of the different synthetic images to comprise one feature of multiple features of the new image, and wherein each GAN is trained to map one or more features to one of the different synthetic images.

17. The non-transitory storage medium of claim 15, wherein the template comprises the background image, and at least a portion of training images of the sets of training images comprising attributes associated with the background image, the portion of training images including the attributes to account for effects of the attributes on the background image.

18. The non-transitory storage medium of claim 15, wherein the overlay model to comprise an application to generate the new image as a drawing structure with the template as a base layer and each one of the different synthetic images as a separate layer in the drawing structure.

19. The non-transitory storage medium of claim 15, the overlay model to comprise an overlay GAN, the overlay GAN to overlay the template with each one of the different synthetic images in a determined order to create the new image, the overlay GAN to determine the determined order.

20. The non-transitory storage medium of claim 15, wherein the combination of each of the different synthetic images to the template to comprise provision of the template as an input image to a first model of the set of GAN models in accordance with a determined order.

* * * * *